US009035658B2

(12) United States Patent
Truong et al.

(10) Patent No.: US 9,035,658 B2
(45) Date of Patent: May 19, 2015

(54) METHOD FOR DETECTING A BREAKDOWN IN A SWITCHING CURRENT SOURCE AND CORRESPONDING POWER SOURCE

(75) Inventors: Thanh-Tuan Truong, Paris (FR); Nicolas Geneste, Paris (FR); Gwenaël Esteve, Paris (FR)

(73) Assignee: SAGEM DEFENSE SECURITE, Paris (FR)

( * ) Notice: Subject to any disclaimer, the term of this patent is extended or adjusted under 35 U.S.C. 154(b) by 164 days.

(21) Appl. No.: 13/516,143

(22) PCT Filed: Dec. 16, 2010

(86) PCT No.: PCT/EP2010/007649
§ 371 (c)(1),
(2), (4) Date: Jun. 14, 2012

(87) PCT Pub. No.: WO2011/072843
PCT Pub. Date: Jun. 23, 2011

(65) Prior Publication Data
US 2012/0256636 A1    Oct. 11, 2012

(30) Foreign Application Priority Data

Dec. 17, 2009  (FR) ...................................... 09 59099

(51) Int. Cl.
*G01R 31/327* (2006.01)
*H02P 29/02* (2006.01)
*H02M 1/32* (2007.01)

(52) U.S. Cl.
CPC ............... *H02P 29/021* (2013.01); *H02M 1/32* (2013.01)

(58) Field of Classification Search
CPC .. G01R 31/327; H03K 17/18; H02M 3/33507
USPC ................................ 324/415; 361/18; 363/20
See application file for complete search history.

(56) References Cited

U.S. PATENT DOCUMENTS

| 4,288,831 A | 9/1981 | Dolikian |
| 5,416,689 A | 5/1995 | Silverstein et al. |
| 2004/0145923 A1* | 7/2004 | Van Bodegraven et al. .... 363/20 |
| 2007/0018656 A1* | 1/2007 | Yasue ........................... 324/509 |
| 2007/0217095 A1 | 9/2007 | Choi |

* cited by examiner

*Primary Examiner* — Arleen M Vazquez
*Assistant Examiner* — Brent J Andrews
(74) *Attorney, Agent, or Firm* — Muncy, Geissler, Olds & Lowe, P.C.

(57) ABSTRACT

A method of detecting a fault of a switching electricity source having a control stage responsive to a setpoint signal to deliver a control signal that is modulated with a predetermined duty ratio ($\alpha$) to a power stage that is to deliver electricity to a load. The method includes the steps of: determining at least one nominal value ($\alpha_{min}$, $\alpha_{max}$) for the duty ratio for normal operation, and at least one fault threshold ($\alpha_{SC}$, $\alpha_{OC}$) as a function of the nominal value; determining at least one instantaneous value ($\alpha$) of the duty ratio of the signal issued by the control stage; and comparing the instantaneous value with the fault threshold. A detection circuit implementing the method is also provided.

5 Claims, 1 Drawing Sheet

METHOD FOR DETECTING A BREAKDOWN IN A SWITCHING CURRENT SOURCE AND CORRESPONDING POWER SOURCE

BACKGROUND OF THE INVENTION

1. Field of the Invention

The present invention relates to a method of detecting a fault in a switching electricity source, and to a corresponding electricity source.

The invention is applicable to various types of device and in particular to drivers for controlling actuators of the torque motor or solenoid type, for regulating rotary machines, for switched mode power supplies, . . . .

2. Brief Discussion of the Related Art

Such devices generally make use of an electricity source that implements control of the pulse width modulation (PWM) type.

The electricity source has a control stage and a power stage. The control stage receives a setpoint signal and delivers to the power stage a control signal that is modulated with a predetermined duty ratio. The power stage is connected to a load to which it delivers electricity corresponding to the control signal. For this purpose, the power stage may comprise for example at least one chopper transistor controlled by the control signal.

In certain applications, in which a failure of the control device could have consequences that are considered to be critical, one of the main concerns is detecting faults and preferably identifying failed components.

It is thus known to detect a fault by measuring the voltage and the current at the hot point at the output from the power stage and by measuring the current at the cold point of the output of the power stage. This makes it possible to detect a short circuit in the load (the measured currents are equal to the setpoint current and the voltage is zero), an open circuit in the load (the measured currents are zero whereas the voltage is not zero), and a failure of the electricity source (the measured currents and voltage are zero even through the setpoint signal does not correspond to zero current). This requires relatively complex fault detection logic that is relatively expensive to implement.

SUMMARY OF THE INVENTION

An object of the invention is to provide simple means for detecting and identifying failures when powering a load by means of such a switching electricity source.

To this end, the invention provides a method of detecting a fault of a switching electricity source having a control stage responsive to a setpoint signal to deliver a control signal that is modulated with a predetermined duty ratio to a power stage that is to deliver electricity to a load. The method comprises the steps of:
  determining at least one nominal value for the duty ratio for normal operation, and at least one fault threshold as a function of the nominal value;
  determining at least one instantaneous value of the duty ratio of the signal issued by the control stage; and
  comparing the instantaneous value with the fault threshold.

A fault is detected by using the duty ratio, which is a magnitude that is representative of the power delivered to the load by the electricity source. By comparing the instantaneous duty ratio with a threshold that is determined relative to a nominal duty ratio (either measured beforehand under nominal operating conditions, or else calculated or predicted on the basis of a model), it is possible to detect the existence of a short circuit or of an open circuit in the load.

Advantageously, a range of nominal values is determined. This is advantageous when the operation of the load is liable to give rise to a variation in the current.

Preferably, the method includes the step of measuring the current output by the power stage and verifying whether:
  the current is zero, and where appropriate;
  the setpoint signal corresponds to a zero current.

Detecting the value of the current makes it possible to identify a malfunction in the electricity source itself.

The invention also provides a switching electricity source comprising a control stage, a power stage, and a fault detection module arranged to implement the method of the invention.

BRIEF DESCRIPTION OF THE DRAWINGS

Other characteristics and advantages of the invention appear on reading the following description of particular, non-limiting embodiments of the invention.

Reference is made to the accompanying drawing, in which.

DETAILED DESCRIPTION OF THE PREFERRED EMBODIMENTS

Figure 1:
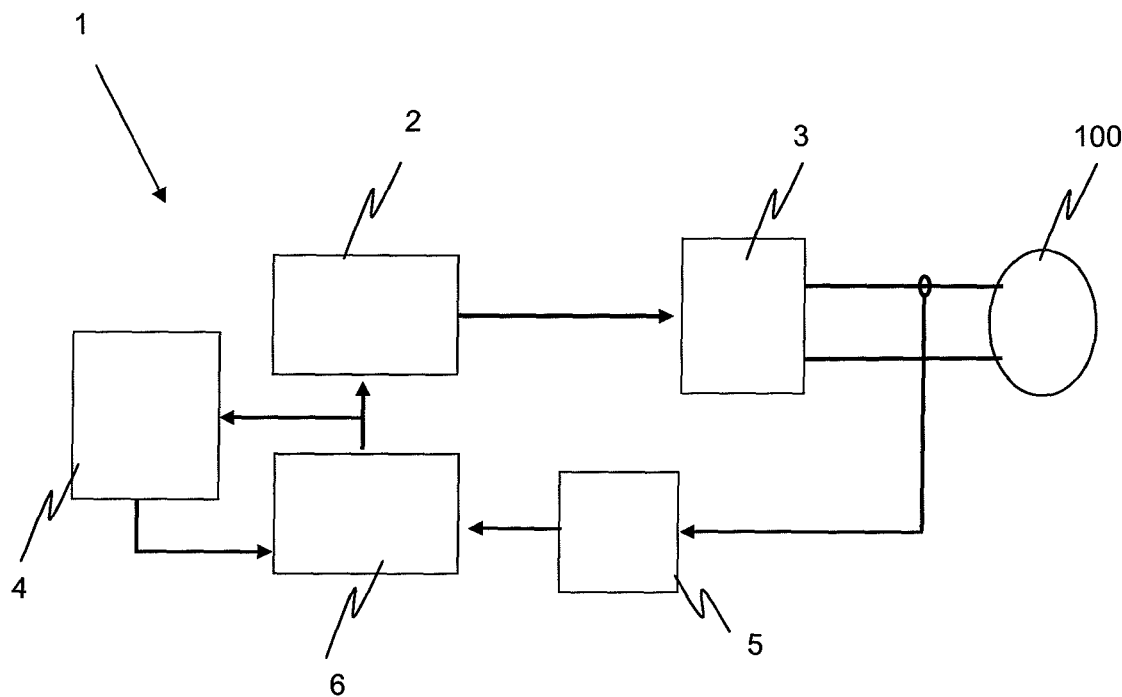
FIG. 1 is a block diagram of an electricity source in a first embodiment of the invention.

With reference to the figures, the invention relates to a switching mode electricity source for connection to a load 100 in order to power it. The load 100 may in particular be a rotary machine, or an actuator of the torque motor or solenoid type.

The electricity source, given overall reference 1, comprises a control stage 2, a power stage 3, and a fault detection module 4 connected to a branch 5 for measuring current between the power stage 3 and the load 100.

The control stage 2 is arranged in a manner that is itself known to deliver to the power stage 3 a control signal that is modulated with a duty ratio that is predetermined as a function of a setpoint signal.

The power stage 3 comprises, in known manner, transistors, each having a control input that receives the control signal to switch the transistors between their ON state and their OFF state as a function of the duty ratio. The current flowing through the transistors is delivered to the load 100.

In the embodiment of FIG. 1, the control stage 2 is of the digital type and includes a unit 6 for calculating the duty ratio, which unit is connected to the detection unit 4 in order to provide it with the instantaneous value of the duty ratio.

Figure 2:
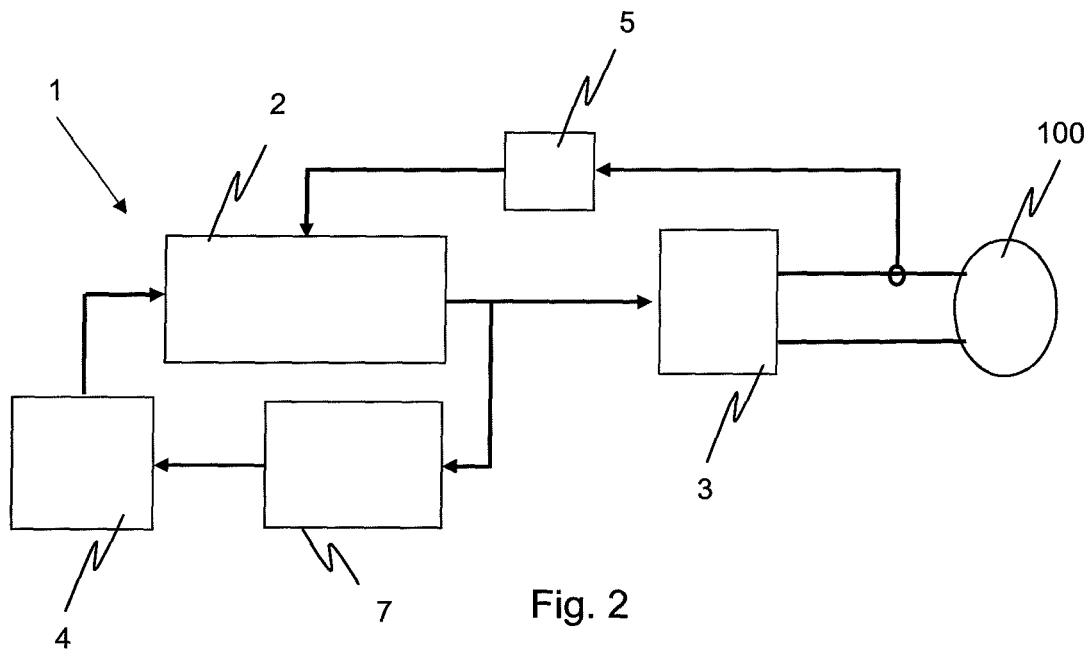
FIG. 2 is a view analogous to FIG. 1 showing an electricity source in accordance with a second embodiment of the invention.

In the embodiment of FIG. 2, the control stage 2 is a regulator of the analog type and the detection module 4 is connected to a member 7 for detecting the control signal output by the control stage 2 and for measuring the duty ratio.

In both embodiments, the detection module 4 is arranged to implement a fault detection method.

This method comprises the steps of:
  determining at least one nominal value for the duty ratio in normal operation of the load 100 and at least one fault threshold as a function of the nominal value;
  determining at least one instantaneous value ☐ of the duty ratio of the modulated signal delivered by the control stage 2; and
  comparing the instantaneous value with the fault threshold.

More precisely, a range of nominal values is determined, namely a minimum value $\alpha_{min}$ and a maximum value $\alpha_{max}$ respectively corresponding to the minimum current and to the maximum current as received by the load 100 in normal operation. The minimum and maximum values $\alpha_{min}$ and $\alpha_{max}$ may be determined theoretically, by calculation, or empirically, by taking measurements while the load is in operation under controlled conditions so as to ensure that its operation is normal. Two fault thresholds are determined on the basis of these values: an open circuit detection threshold $\alpha_{OC}$ that is greater than the maximum value $\alpha_{max}$, and a short circuit detection threshold $\alpha_{SC}$ that is less than the minimum value $\alpha_{min}$. The extent to which the thresholds $\alpha_{OC}$ and $\alpha_{SC}$ are respectively greater than the maximum value $\alpha_{max}$ and less than the minimum value $\alpha_{min}$ is determined so as to avoid false detection as a result of an exceptional and brief variation in the current during normal operation of the load 100, e.g. as a result of a transient between two states of the load. The open circuit threshold $\alpha_{OC}$ may for example be 20% greater than the maximum value $\alpha_{max}$, and the short circuit threshold $\alpha_{SC}$ may for example be 20% less than the minimum value $\alpha_{min}$.

The method also includes the step of measuring the current I at the hot point ($I_h$) and/or at the cold point ($I_C$) at the output from the power stage 3 via the branch 5 and of verifying whether:

the current is zero, and where appropriate;

the setpoint signal corresponds to a zero current.

This serves to detect faults of the electricity source.

The table below summarizes the various causes of such a fault.

| | Fault detection conditions | | | |
|---|---|---|---|---|
| Identifiable faults | Measure $I_h$ | Measure $I_C$ | $\alpha$ | Setpoint |
| Load short circuited | | | $<\alpha_{SC}$ | |
| Load open circuit | | | $>\alpha_{OC}$ | |
| Driver fault | = 0 | = 0 | = 0 | ≠ 0 |

Naturally, the invention is not limited to the above-described embodiments but covers any variant coming within the ambit of the invention as defined by the claims.

In particular, the electricity source may be of a structure that is different from that described, so long as said structure enables the method of the invention to be implemented.

It is possible to detect a plurality of instantaneous values for the duty ratio, e.g. over a given period.

What is claimed is:

1. A method of detecting a fault of a switching electricity source having a control stage responsive to a setpoint signal to deliver a control signal that is modulated with a predetermined duty ratio ($\alpha$) to a power stage that is to deliver electricity to a load, wherein the method comprises the steps of:

determining at least one nominal value ($\alpha_{min}$, $\alpha_{max}$) for the duty ratio for normal operation, and at least one fault threshold ($\alpha_{SC}$, $\alpha_{OC}$) as a function of the nominal value;

determining at least one instantaneous value ($\alpha$) of the duty ratio of the signal issued by the control stage;

comparing the instantaneous value with the fault threshold; and measuring the current output by the power stage and verifying whether:

the current ($I_h$) is zero, and where appropriate;

the setpoint signal corresponds to a zero current.

2. The method according to claim 1, wherein a range of nominal values ($\alpha_{min}$, $\alpha_{max}$) is determined.

3. A switching electricity source, comprising a control stage, a power stage, and a fault detection module arranged to implement the method according to claim 1, wherein the detection module is connected to a branch for measuring current between the power stage and the load.

4. The source according to claim 3, wherein the control stage is of the digital type and comprises a unit for calculating the duty ratio, which unit is connected to the detection module in order to provide it with the instantaneous value of the duty ratio.

5. The source according to claim 3, wherein the control stage is of the analog type and the detection module is connected to a member for detecting the control signal and for measuring the duty ratio.

* * * * *